(12) United States Patent
Okuma et al.

(10) Patent No.: US 6,832,857 B2
(45) Date of Patent: Dec. 21, 2004

(54) PLASTIC OPTICAL FIBER FERRULE

(75) Inventors: Masafumi Okuma, Saitama (JP); Kenichi Mitani, Tokyo (JP); Junji Ichikawa, Yokohama (JP)

(73) Assignee: Kabushiki Kaisha Act One, Tokyo (JP)

(*) Notice: Subject to any disclaimer, the term of this patent is extended or adjusted under 35 U.S.C. 154(b) by 113 days.

(21) Appl. No.: 10/074,377

(22) Filed: Feb. 11, 2002

(65) Prior Publication Data
US 2003/0077042 A1 Apr. 24, 2003

(30) Foreign Application Priority Data
Oct. 23, 2001 (JP) ......................... 2001-324891

(51) Int. Cl.[7] .................. G02B 6/38; G02B 6/36
(52) U.S. Cl. .................. 385/60; 385/73; 385/84
(58) Field of Search .................. 385/60, 72, 73, 385/84

(56) References Cited

U.S. PATENT DOCUMENTS

| | | | | |
|---|---|---|---|---|
| 4,444,461 A | * | 4/1984 | Wey et al. ............... | 385/72 |
| 4,461,539 A | * | 7/1984 | Bailey et al. ............ | 385/73 |
| 4,950,048 A | * | 8/1990 | Kakii et al. ............. | 385/83 |
| 5,231,685 A | * | 7/1993 | Hanzawa et al. ......... | 385/84 |
| 5,282,258 A | * | 1/1994 | Hoshino .................. | 385/70 |

FOREIGN PATENT DOCUMENTS

| | | |
|---|---|---|
| JP | 10-287013 A1 | 4/2000 |
| JP | 11-278890 A1 | 4/2001 |

* cited by examiner

*Primary Examiner*—Chandrika Prasad
(74) *Attorney, Agent, or Firm*—Marshall & Melhorn, LLC

(57) ABSTRACT

An insert pipe is fitted on an outer circumferential surface of a front end of a ferrule provided with a core wire receiving bore in an axial center thereof, and a small-diameter tubular portion is insert molded coaxially with the insert pipe 4 around the core receiving bore adjacent to the front end, a thin-walled plastic portion being formed inside the small-diameter tubular portion. A plastic reservoir may be provided in a part of the plastic ferrule remote from the front end of the core wire receiving bore. The provision of the thin-walled plastic portion and/or the plastic reservoir prevents the tapering of the core wire receiving bore due to thermal shrinkage following the injection molding process.

10 Claims, 6 Drawing Sheets

PLASTIC OPTICAL FIBER FERRULE

TECHNICAL FIELD

The present invention relates to a ferrule for optical fiber connectors used for connecting optical fiber cables, and a method for injection molding such a ferrule. In particular, the present invention relates to a plastic ferrule and a method for making the same which allow a ferrule having highly precise external dimensions and coaxiality to be mass produced easily and economically by means of an injection molding process using an insert pipe.

BACKGROUND OF THE INVENTION

Ferrules of this kind are disclosed in Japanese patent laid open publications Nos. 2000-111758 and 2001-96570. According to these ferrules, an insert pipe consisting of a metallic pipe is fitted onto the front end of the ferrule provided with a core wire receiving bore for receiving an extremely fine optical fiber core wire, and this pipe extends to at least a flange portion provided in an axially intermediate part of the ferrule.

Such a ferrule can be made by placing an insert pipe provided with communication holes for passing plastic material in a part thereof corresponding to a flange portion in a metallic die assembly, placing core pins in an axial center for defining bores for receiving a core wire and a sheath at an end of an optical fiber, and injecting plastic material from a gate provided near the communication holes so as to pass the plastic material into the communication holes. The entire ferrule including the flange portion can be thus injection molded as an integral assembly.

Because such a ferrule is injection molded by using an insert pipe, a required level of circularity can be ensured for the outer circumference of the front end of the ferrule, and the precision in external dimensions and coaxiality can be improved. Also, a favorable registration can be achieved when connecting the ferrule to an opposing ferrule by using a sleeve commonly fitted over the two ferrules, and the positional precision for the optical core wire which is fitted into the core wire receiving bore can be improved. These factors contribute to the reduction in the transmission loss.

However, such a ferrule is not without some problems that are desired to be resolved. First of all, the core wire receiving bore may not be provided with a uniform diameter, and tends to be tapered. This not only causes difficulty in inserting an optical fiber core wire but also may cause cracks and deformations in the core wire. Cracks and deformations in the core wire increase transmission loss and reflective attenuation, and prevent the light signal from traveling along a linear straight path. These factors severely impair the performance of the optical fiber connector.

When the core pin is removed from the core wire receiving bore immediately after the ferrule is molded and knocked out from the metallic die assembly, the plastic material undergoes a thermal contraction which tends to be more pronounced toward the front end at which the insert pipe opens out so that the core wire receiving bore tends to be tapered toward the front end. The inventors have discovered that this tendency gets pronounced particularly when the mass of the plastic material in the front end is large or the wall thickness is great.

When molding a ferrule, the plastic material is typically injected from a gate provided near the intermediate flange portion, and then flows toward the front end. The front part of the flow of the plastic material includes a higher component of slag or other non-uniform part of the plastic material, and eventually reaches the front end portion of the ferrule in which the core wire receiving bore is defined by the core pin. Therefore, the front end of the ferrule tends to suffer from pronounced flow marks and shrinkage which distort the core wire receiving bore and impair the coaxiality of the core wire receiving bore with respect to the insert pipe. The outer circumferential surface of the insert pipe defines the outer diameter of the front end of the ferrule.

If the core pin is kept in the core wire receiving bore following the molding process until the thermal shrinkage has ceased so as to ensure a uniform inner diameter of the core receiving bore as a measure against the aforementioned problem. This will produce a uniform core wire receiving bore. However, the resulting thermal shrinkage will prevent the core pin to be removed, and forcing the removal of the core pin may damage and/or deform the core pin and core wire receiving bore. This will severely impair the production efficiency in mass production.

If communication holes are formed in the insert pipe for permitting the passage of injected plastic material, preparing the insert pipe creates a problem. Drilling the communication holes and maintaining the circularity of the insert pipe without deforming it is not easy. The grinding work for removing burrs that may form around each communication hole is also not easy. These factors contribute to the increase in the production cost of the insert pipe, and prevent the cost minimization in mass producing ferrules.

BRIEF SUMMARY OF THE INVENTION

In view of such problems of the prior art, a primary object of the present invention is to provide a plastic ferrule and a method for molding the same that are free from such problems.

A second object of the present invention is to ensure a constant and uniform inner diameter to the core wire receiving bore provided in the front end of the ferrule.

A third object of the present invention is to ensure highly precise external dimensions and coaxiality by means of the process of injection molding using an insert pipe in a both easy and economical manner.

A fourth object of the present invention is to provide an optical fiber cable ferrule which can be mass produced in an efficient manner.

A fifth object of the present invention is to provide an improved method for making such an optical fiber cable ferrule.

According to the present invention, these objects can be accomplished by providing a plastic ferrule for an optical fiber cable, comprising: a substantially cylindrical main body made of molded plastic material; a core wire receiving bore formed axially centrally in a front end portion of the ferrule main body; a sheath receiving bore formed axially centrally in a rear end portion of the ferrule main body in axial alignment with and in communication with the core wire receiving bore, the core wire receiving bore having a smaller inner diameter than the sheath receiving bore; a flange portion extending radially and integrally from an axially intermediate part of the ferrule main body; and an insert pipe fitted on the front end portion of the ferrule main body; the insert pipe being provided with a coaxial small-diameter tubular portion in a front end thereof so as to form a thin-walled plastic portion between an inner circumferential surface of the small-diameter tubular portion and the core wire receiving bore.

Owing to the provision of the thin-walled plastic portion around the core wire receiving bore adjacent to the front end surface of the ferrule, the tapering of the core wire receiving bore due to thermal shrinkage following the injection molding process can be controlled. The thin-walled plastic portion has a relatively small mass as compared to the remaining part surrounding the core wire receiving bore, and therefore produces a relatively small shrinking force which mitigates the tendency of this part of the core wire receiving bore to diminish in diameter. Therefore, the inner diameter of the core wire receiving bore can be formed at a required precision so that an extremely fine optical fiber core wire can be inserted easily without causing cracks and deformations in the core wire, and various factors such as an increase in transmission loss and reflective attenuation and impairment of linearity that impair the performance of the connector can be avoided.

The small-diameter tubular portion can be formed in a number of possible ways, such as by drawing a front end portion of the insert pipe, machining an outer circumference of a front end portion of the insert pipe, and folding a front end of the insert pipe coaxially inward.

The small-diameter tubular portion can be formed also by forming the insert pipe with an outer pipe portion and an inner pipe portion received coaxially in the outer pipe portion, and projecting a front end portion of the inner pipe portion from a front end of the outer pipe portion. The outer and inner pipe portions may be closely fitted one in the other. According to another embodiment, a base end of the inner pipe portion is closely fitted in the outer pipe portion and a front end of the inner pipe portion is spaced radially inward from the outer pipe portion. According to yet another preferred embodiment of the present invention, the inner pipe portion extends substantially over an entire length of the ferrule main body, and defines an inner circumferential surface of the sheath receiving bore of the ferrule main body while the outer pipe portion defines an outer circumferential surface of the front end of the ferrule.

The inventors have also discovered that the front end of the flow of plastic material that is injected into the cavity contains a higher component of slag or other non-uniform part of the plastic material, and such a part undergoes a thermal contraction in a somewhat unpredictable manner. Therefore, if such a part is allowed to form the front end of the ferrule main body at which the core wire receiving bore opens out, the uniformity in the inner diameter of the core wire receiving bore would be impaired. It is therefore preferable to control the flow of the injected plastic material so as to prevent the front end of the flow of the plastic material from forming the front end of the ferrule main body.

Based on such a consideration, it is preferred that a front end of the small-diameter tubular potion terminates short of a front end surface of the ferrule main body, and the ferrule main body comprises a plastic reservoir formed around the front end of the small diameter tubular portion. The provision of such a plastic reservoir prevents the generation of pronounced flow marks and shrinkage which distort the core wire receiving bore adjacent to the front end and impair the coaxiality of the core wire receiving bore with respect to the insert pipe which defines the outer diameter of the ferrule. This in turn allows the ferrule to be connected to an opposing ferrule at a highly precise registration.

The plastic reservoir may be provided around the small-diameter tubular portion so as to communicate with the thin-walled plastic portion via the front end of the thin-walled plastic portion. This allows the prevention of the distortion in the inner diameter of the front end portion of the core wire receiving bore and the tapering of the core wire receiving bore both easily and economically.

If the insert pipe comprises an outer pipe portion and an inner pipe portion which are radially spaced from each other, the plastic reservoir may be formed in an axially middle part of the ferrule main body. For instance, the insert pipe may be designed in such a manner that the plastic material injected from the flange portion reaches the front end of the ferrule main body and, after turning around the front edge of the inner pipe portion, is directed toward the axially middle part of the ferrule main body. A slag component may safely form an axially middle part of the ferrule main body without creating any serious problem.

The method for molding a plastic ferrule according to the present invention may comprise the steps of: preparing a die assembly defining a substantially cylindrical cavity therein for molding the ferrule main body; placing a first core pin for defining the core wire receiving bore axially centrally in a first axial end of the cavity corresponding to the front end of the ferrule main body and a second core pin for defining the sheath receiving bore axially centrally in a second axial end of the cavity corresponding to the rear end of the ferrule main body, both in a retractable manner; placing an insert pipe coaxially adjacent to the first axial end of the cavity, the insert pipe including a small-diameter portion in an axial front end thereof; and injecting plastic material into the cavity from a gate provided in an axially intermediate part of the cavity.

According to a preferred embodiment of the present invention, the die assembly comprises a sprue and a passage communicating between the sprue and the cavity, the passage including an annular section coaxially surrounding a part of the cavity corresponding to the flange portion of the ferrule main body and a plurality of discrete passages extending radially between the annular section and the cavity part corresponding to the flange portion at a circumferentially regular interval. Alternatively, the radial passages may be replaced by a disk-shaped passage extending radially between the annular section and the cavity part corresponding to the flange portion. Thereby, the plastic material is conducted into the cavity substantially in a circumferentially uniform manner, and this also contributes to the precision in the dimensions and shape of the ferrule main body.

The insert pipe for the plastic ferrule of the present invention preferably extends along the outer circumference of the front end of the ferrule main body to a part of the flange portion or partly overlaps the flange portion. The base end of the insert pipe may extend into a part of a flange of the ferrule, and the gate may be provided adjacent to a part of the flange more rearward than the base end of the insert pipe.

The insert pipe may be formed with communication holes for passing plastic material similarly as the prior art. However, by eliminating the communication holes, the circularity of the outer circumferential surface of the insert pipe serving as the mating surface for a connector sleeve can be ensured without difficulty. Also, the grinding work is simplified, and the manufacturing cost of the insert pipe can be minimized so that the cost of the ferrule can be reduced by mass production.

The material for the insert pipe may be selected from any hard metallic materials such as stainless steel, titanium and fiber reinforced metals (FRM), ceramic materials such as zirconia, and heat resistance and dimensionally stable plastic materials such as polyimide resin, among other possibilities.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
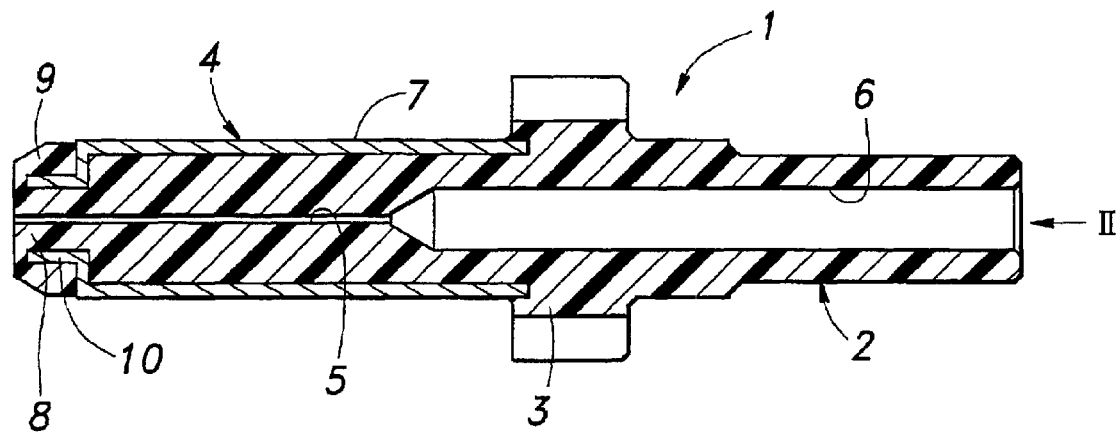
FIG. 1 is a longitudinal sectional view of a plastic ferrule for an optical fiber embodying the present invention.
Figure 2:
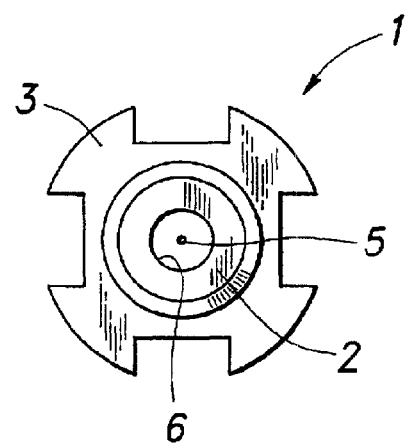
FIG. 2 is an end view as seen in the direction indicated by arrow II in FIG. 1.

Referring to FIGS. 1 and 2, a ferrule 1 of the first embodiment is formed by integrally forming, by an injection molding process, a ferrule main body 2 made of a tubular plastic member and adapted to receive an end of an optical fiber in an axial center thereof, a flange portion 3 made of plastic material and extending radially from an axially intermediate part of the ferrule main body 2, and an insert pipe 4 made of hard material and fitted around the front end of the ferrule main body 2. The ferrule main body 2 is provided with a core wire receiving bore 5 axially centrally in a front end portion thereof, and a sheath receiving bore 6 axially centrally in a rear end portion thereof so as to be in communication and in registration with each other.

The insert pipe 4 extends along the outer circumference of the front end of the ferrule main body 2 with an outer circumferential surface exposed so as to define a mating surface 7 for fitting a connector sleeve thereon. The base end of the insert pipe 4 may be embedded generally in the flange portion 3, optionally extending to the rear end of the flange portion 3, as was the case with the prior art, or terminate immediately before the flange portion 3. Alternatively, the base end of the insert pipe 4 may be embedded only partially in the flange portion 3 as illustrated in FIG. 1. In other words, the base end of the insert pipe 4 may partly overlap the flange portion 3.

To allow plastic material to be injected from the flange portion 3 without providing communication holes for passing plastic material in the base end portion of the insert pipe 4, it is preferable for the base end of the insert pipe 4 to be only partially embedded in the flange portion 3 as is the case with the illustrated embodiment, or to terminate immediately before the flange portion. In view of mechanical strength and other considerations, the illustrated embodiment is preferred.

As a measure to ensure the inner diameter of the core wire receiving bore 5 to be uniform, a small-diameter tubular portion 10 coaxial with the insert pipe 4 is insert molded at least in the part of the outer circumference of the core wire receiving bore 5 adjacent to the front end surface of the ferrule 1, and a thin-walled plastic portion 8 of the ferrule main body 2 is formed around the core wire receiving bore 5 by this small-diameter tubular portion 10. In the embodiment illustrated in FIGS. 1 and 2, the small-diameter tubular portion 10 is formed by drawing the front end of the insert pipe 4. The insert pipe 4 in this embodiment is made of stainless steel, but may also consist of hard metallic materials such as titanium and fiber reinforced metals (FRM), ceramic materials such as zirconia, and heat resistance and dimensionally stable plastic materials such as polyimide resin, among other possibilities.

As a measure to eliminate distortion in the inner diameter due to slag and other non-uniform part of the plastic material, a plastic reservoir 9 is formed in a radially spaced part of the outer periphery of the core wire receiving bore 5 adjacent to the front end. In the embodiments illustrated in FIGS. 1 and 2, the plastic reservoir 9 is formed around the small-diameter tubular portion 10 formed in the front end of the insert pipe 4.

Figure 3:
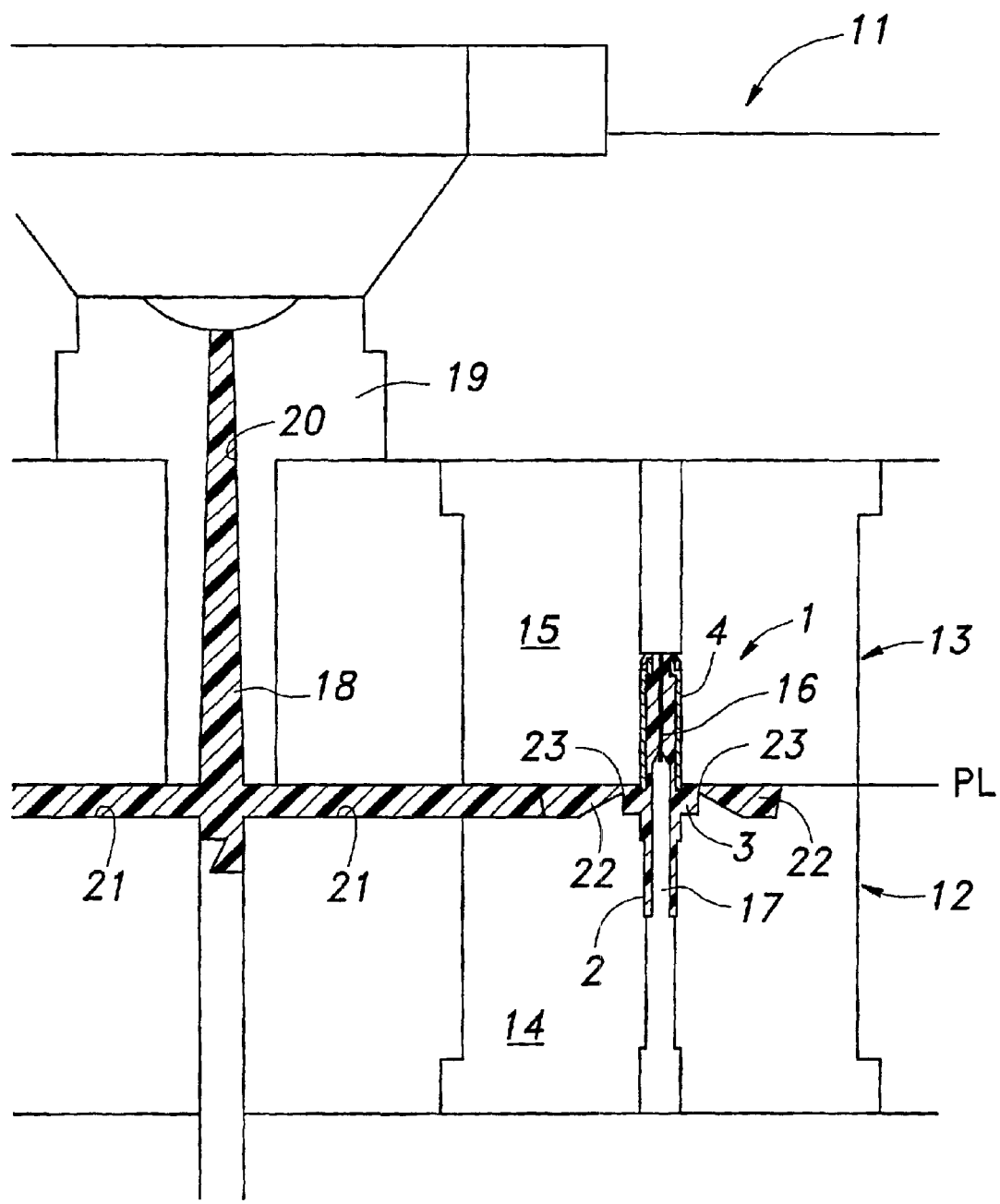
FIG. 3 is a simplified longitudinal sectional view of a metallic die assembly for molding the ferrule of the present invention.

Referring to FIG. 3, the metallic die assembly 11 for molding the ferrule 1 comprises a moveable die set 12 and a fixed die set 13 opposing each other, bounded by a parting plane (PL). An insert pipe 4 is placed in a cavity defined jointly in a moveable die plate 14 and a fixed die plate 15, and a first core pin 16 for defining the core wire receiving bore 5 is retractably placed axially centrally in the front end portion while a second core pin 17 for defining the sheath receiving bore 6 is retractably placed axially centrally in the rear end portion.

The plastic material 18 preferably consists of the kind having a high mechanical strength and dimensional stability such as liquid crystal polymer. When injection molding a ferrule 1, the plastic material 18 is distributed from a sprue 20 provided in a sprue bush 19 to a plurality of runners 21 (to mold a plurality of ferrules simultaneously) and introduced into an annular passage 22 concentrically surrounding the part of the cavity corresponding to the flange portion 3. The runner 21 leading to this annular passage consists of a single passage, but a plurality (four, for instance) of discrete radial passages 23 arranged evenly circumferentially are provided between the cavity and the annular passage 22. Alternatively, the discrete radial passages 23 may be replaced with a disk-shaped passage extending continually over the entire circumference between the cavity and the annular passage 22. Thus, the plastic material can be uniformly injected into the cavity, and this contributes to the elimination of flaw marks and other unevenness detrimental to dimensional precision.

The injected plastic material 18 is filled into a part of the cavity defined by the inner surface of the die assembly 11 and the second core pin 17 to form the rear end of the ferrule main body 2 on the one hand, and into a part of the cavity defined by the inner surface of the die assembly 11 and the first core pin 16 to form the front end of the ferrule main body 2 on the other hand, while, at the same time, the flange portion 3 is integrally molded to an intermediate part of the ferrule main body 2 with the base end of the insert pipe 4 buried therein.

The flow of the plastic material 18 that has been filled into the inert pipe 4 is narrowed by the small-diameter tubular portion 10, and after turning around the free end of the small-diameter tubular portion 10, flows into the plastic reservoir 9 formed around the small-diameter tubular portion 10. Thereby, the small-diameter tubular portion 10 forms the thin-walled plastic portion 8 having a relatively small mass, and the slag component at the front end of the flow of the plastic material is trapped in the plastic reservoir 9.

According to this ferrule, because the thin-walled plastic portion 8 is formed by the small-diameter tubular portion 10 in the front end portion of the ferrule main body 2, the tapering of the core wire receiving bore 5 due to thermal contraction can be significantly reduced, and a uniform inner diameter can be ensured so that the insertion of the optical fiber core wire is facilitated, and the possibility of damaging and/or deforming the first core pin can be reduced. These factors contribute to the improvement in the performance of the connector through the prevention of an increase in transmission loss and reflective attenuation, and the enhancement of linearity in the transmission path of the light signal.

By forming the plastic reservoir 9 around the thin-walled plastic portion 8 by virtue of the small-diameter tubular portion 10 of the insert pipe 4, the slag component of the plastic material at the front end of the plastic material flow moves into the plastic reservoir 9 which is remote from the axial center at which the core wire receiving bore 5 is formed so that flow marks and shrinkage around the core wire receiving bore 5 can be avoided to be produced, and the distortion in the core wire receiving bore 5 can be minimized.

If the base end of the insert pipe 4 is buried in a part of the flange portion 3, even when the insert pipe 4 is not provided with communication holes for passing plastic material as opposed to the prior art, the injection molding process can be carried out by providing a gate adjacent to the flange portion 3. As a result, the circularity of the insert pipe 4 can be ensured due to the absence of a drilling process, and this contributes to the improvement in coaxiality. Also, the grinding work is simplified, and the manufacturing cost of the insert pipe can be minimized so that the cost of the ferrule can be reduced by mass production.

Because the inner diameter of the core wire receiving bore 5 for receiving an optical fiber core wire can be properly controlled, the need for keeping the core pin 16 in the core wire receiving bore 5 until the thermal contraction ceases can be eliminated so that the ferrule can be knocked out from the die assembly immediately after the molding process, and the work efficiency during the mass production process can be improved. Also, the core pin 16 can be pulled out from the core wire receiving bore 5 easily without risking the possibility of damaging and/or distorting the core pin 16 and the core wire receiving bore 5 due to thermal contraction.

Because the injection molding process is carried out by using the insert pipe, the circularity of the mating surface 7 on the outer circumference of the front end of the ferrule is ensured, and the precision in external dimensions and coaxiality is improved. Also, the registration with the opposing ferrule when joining the two ferrules by fitting a connecting sleeve such as a split sleeve on the mating surface 7 is ensured, and the positional accuracy of the optical fiber core wire inserted in the core wire receiving bore in the axial center is improved so that there is no shortcoming as compared to the prior art.

Figure 4:
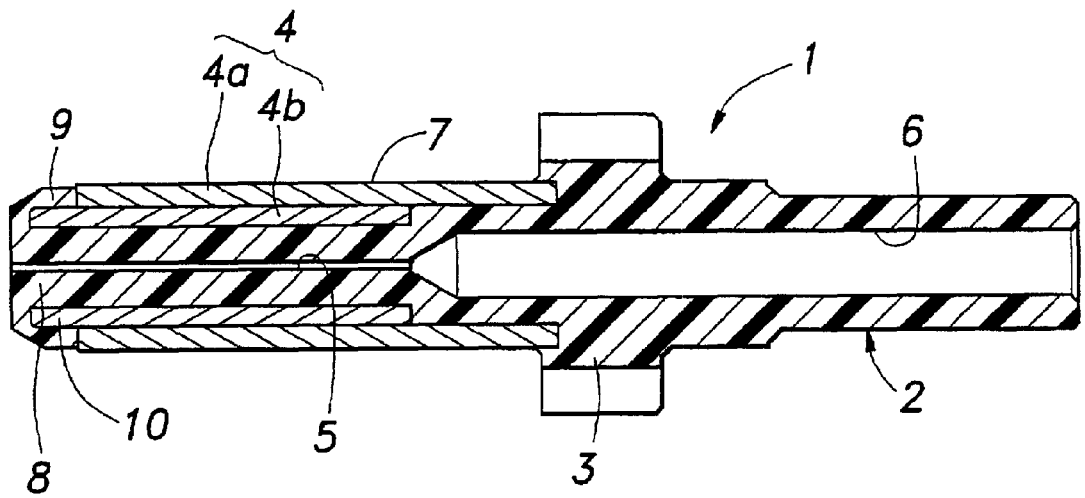
FIG. 4 is a longitudinal sectional view of a second embodiment of the present invention.

FIG. 4 shows a second embodiment of the present invention. In this and other embodiments, the parts corresponding to the preceding embodiment(s) are denoted with like numerals. The insert pipe 4 in this case consists of a pair of coaxially nested pipe portions 4a and 4b. The two pipe portions are closely fitted one into the other, and the front end of the inner pipe portion 4b slightly projects from the front end of the outer pipe portion 4a so as to define the small-diameter tubular portion 10 with the projecting part of the front end of the inner pipe portion 4b. The rear end of the inner pipe portion 4b is axially offset or withdrawn from the rear end of the outer tube portion so that an adequate space is defined between the inner bore of the insert pipe 4 and the front end of the sheath receiving bore 6 and an adequate wall thickness is ensured for the ferrule main body 2 in this part. This obviously contributes to the improved mechanical strength and dimensional stability of the ferrule.

Figure 5:
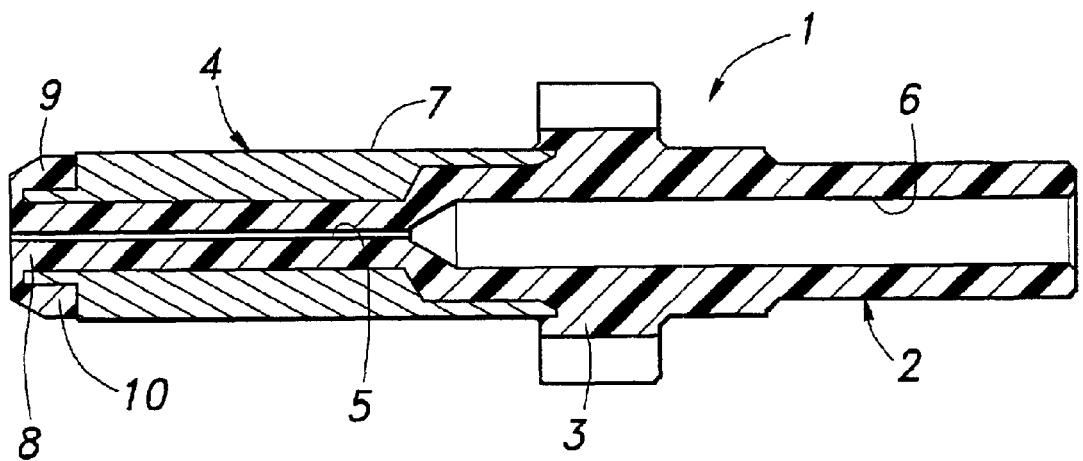
FIG. 5 is a longitudinal sectional view of a third embodiment of the present invention.

FIG. 5 shows a third embodiment of the present invention. The small-diameter tubular portion 10 is formed by machining the outer periphery of the front end of the insert pipe 4. The inner periphery of the rear end of the insert pipe 4 is also machined so as to define a space for ensuring an adequate wall thickness for the ferrule main body 2 in this part.

Figure 6:
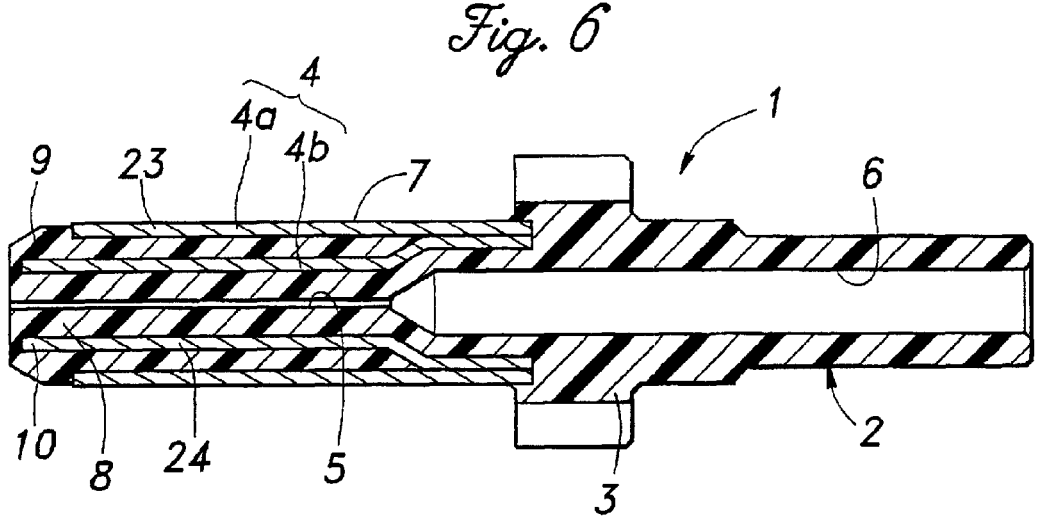
FIGS. 6 to 8 are longitudinal sectional views of fourth to sixth embodiments of the present invention.

FIG. 6 shows a fourth embodiment of the ferrule 1 according to the present invention. In this case, the insert pipe 4 of the ferrule consists of a pair of coaxial pipe portions consisting of a straight outer pipe portion 4a extending along the outer circumferential surface of the front end of the ferrule main body 2 and an inner pipe portion 4b having a base end of a relatively large diameter which closely fits into the inner circumferential surface of the outer pipe portion 4a and a remaining part of a relatively small diameter, a front end of the inner pipe portion 4b defining a small-diameter tubular portion 10 which is radially spaced inward from the inner circumferential surface of the outer pipe portion 4a. These two pipe portions 4a and 4b may be integrally joined to each other by welding or the like, or may also be simply closely fitted one into the other.

According to this ferrule 1, the thin-walled plastic portion 8 of the ferrule main body 2 is formed inside the small-diameter tubular portion 10 which is reduced in diameter from the inner pipe portion 4b of the insert pipe 4, and the plastic reservoir 9 is formed between the outer surface of the inner pipe portion 4b and the inner surface of the outer pipe portion 4a. The outer circumferential surface of the outer pipe portion 4a defines the mating surface 7 for the sleeve that join the ferrule to another ferrule. Because the thin-walled plastic portion 8 and the plastic reservoir 9 can be formed over a relatively large region, the advantages of the present invention will be particularly enhanced.

Figure 7:
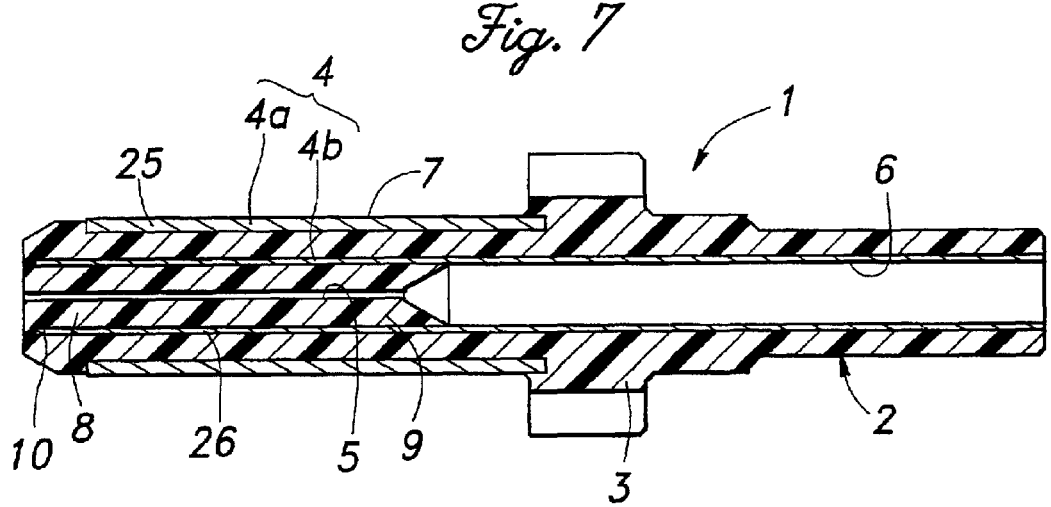

FIG. 7 shows a fifth embodiment of the ferrule 1 according to the present invention. The insert pipe 4 of the ferrule 1 consists of a pair of coaxial pipe portions including a straight outer pipe portion 4a extending along the outer circumferential surface of the front end of the ferrule main body 2 and a straight inner pipe portion 4b extending along the inner circumferential surface of the optical fiber sheath receiving bore 6. The front end of the inner pipe portion 4b of the insert pipe 4 defines a small-diameter tubular portion 10 defining a thin-walled plastic portion 8 of the ferrule main body 2 therein. The outer circumferential surface of the outer pipe portion 4a defines a mating surface 7 for a sleeve for connecting the ferrule to another ferrule. However, no plastic reservoir is provided, as opposed to the foregoing embodiments.

In this case, the plastic material is injected from the flange portion 3 and flows between the inner and outer pipe portions 4a and 4b. This flow turns inward at the front edge of the inner pipe portion 4b and flows back toward the flange portion between the inner pipe portion 4b and the core wire receiving bore 5. Therefore, this embodiment provides the advantage of avoiding the tapering of the core wire receiving bore 5 and ensuring a uniform inner diameter for the core wire receiving bore 5 in a similar manner as any of the foregoing embodiments, but does not provide the advantage of avoiding the problems that may be caused by slag in a similar fashion. However, according to this embodiment, slag is pushed toward the base end of the core wire receiving bore 5 (plastic reservoir 9) where the presence of slag would not create any significant problem, and an advantage over the prior art can be gained to a certain extent.

Figure 8:
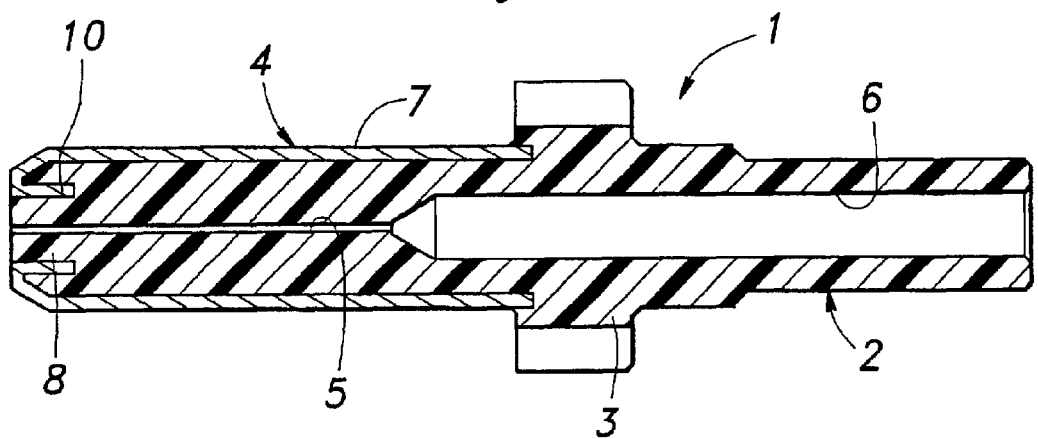
Figure 9:
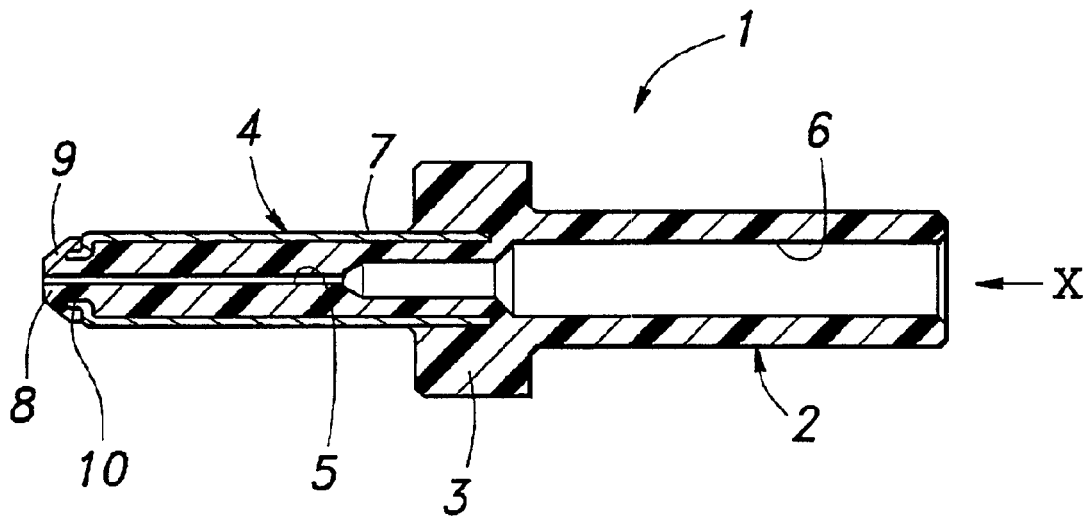
FIG. 9 is a longitudinal sectional view of a seventh embodiment of the present invention.
Figure 10:
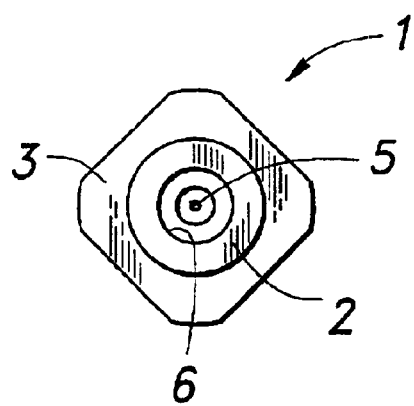
FIG. 10 is an end view as seen in the direction indicated by arrow X in FIG. 9.
Figure 11:
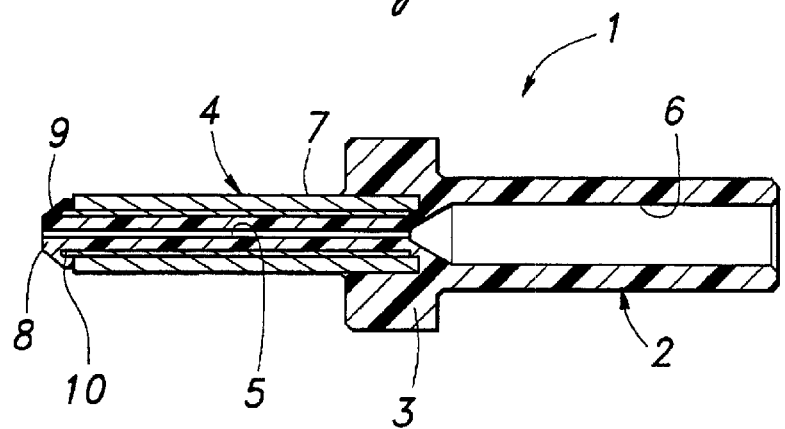
FIGS. 11 to 13 are longitudinal sectional views of eighth to tenth embodiments of the present invention.

FIG. 8 shows a sixth embodiment of the ferrule 1 according to the present invention. The insert pipe 4 of the ferrule 1 extends along the outer circumferential surface of the front end of the ferrule main body 2, and defines a mating surface 7 for a sleeve for connecting the ferrule to another ferrule. The front end of the insert pipe 4 is folded inward so as to define a small-diameter tubular portion 10, and a thin-walled plastic portion 8 is formed inside the small-diameter tubular portion 10. No plastic reservoir is provided in this case.

Therefore, this embodiment provides the advantage of avoiding the tapering of the core wire receiving bore 5 and ensuring a uniform inner diameter for the core wire receiving bore 5 in a similar manner as any of the foregoing embodiments, but does not provide the advantage of avoiding the problems that may be caused by slag. However, according to this embodiment, slag is distributed between the interior and exterior of the small-diameter tubular portion 10 as the plastic material is injected, and the small-diameter tubular portion 10 opposes the thermal contraction of the plastic material outside the insert pipe 4 so that the present invention provides an improvement over the prior art to some extent even in connection with the problems associated with the presence of slag.

The embodiments described above are suited for applications not only to the standard size ferrule having an outer diameter of 2.499 mm in the free end (the core wire receiving bore having an inner diameter of 0.125 mm) and a relatively thick molded plastic part but also to the half size ferrule having an outer diameter of 1.249 mm in the free end (the core wire receiving bore having an inner diameter of 0.125 mm) and a relatively thin molded plastic part.

FIGS. 9 to 13 show embodiments similar to those described above that are applied to the half size ferrule. In the ferrule 1 illustrated in FIGS. 9 and 10, similarly to the ferrule 1 illustrated in FIGS. 1 and 2, the small-diameter tubular portion 10 is formed by drawing the front end of the insert pipe 4. In the ferrule 1 illustrated in FIG. 11, similarly to the ferrule 1 illustrated in FIG. 4, the small-diameter tubular portion 10 is formed by providing a step in the front end of the insert pipe 4 consisting of a pair of coaxial pipe portions.

Figure 12:
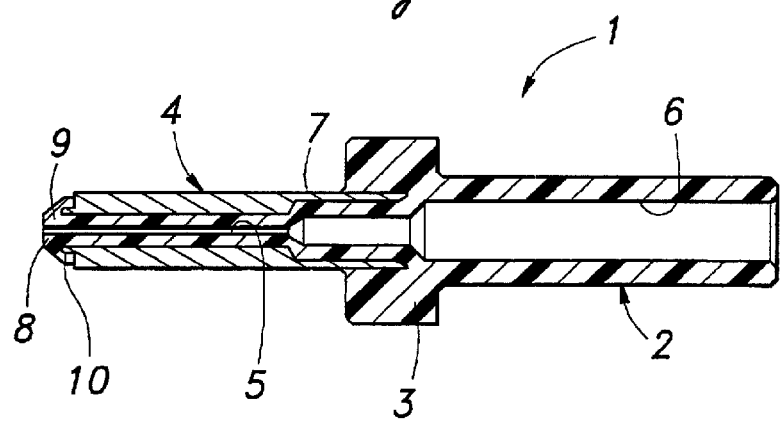
Figure 13:
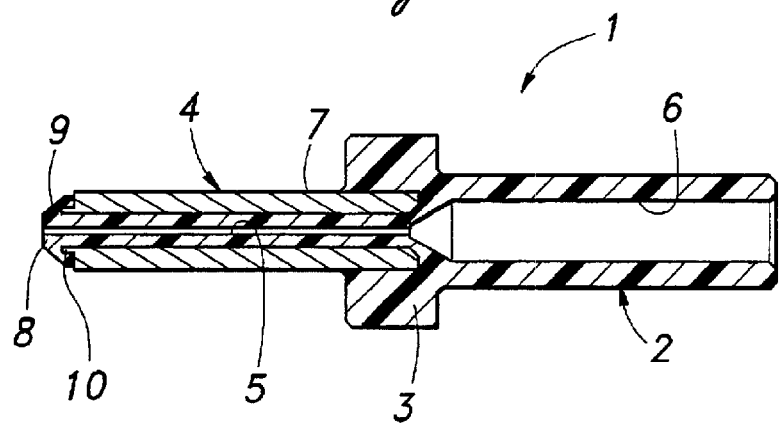

In the ferrules 1 illustrated in FIGS. 12 and 13, similarly to the ferrule 1 illustrated in FIG. 5, the small-diameter tubular portions 10 are formed by machining the front ends of the insert pipes 4, respectively. According to these embodiments, a thin-walled plastic portion 8 and a plastic reservoir 9 are formed in the front end of the ferrule main body 2 in each case. These embodiments provide similar advantages as those obtained by the application of the present invention to the standard size ferrule, and eliminate the problems of the prior art in a similar fashion.

Although the present invention has been described in terms of preferred embodiments thereof, it is obvious to a person skilled in the art that various alterations and modifications are possible without departing from the scope of the present invention which is set forth in the appended claims.

What is claimed is:

1. A plastic ferrule for an optical fiber cable, comprising:

a substantially cylindrical main body made of molded plastic material;

a core wire receiving bore formed axially centrally in a front end portion of said ferrule main body;

a sheath receiving bore formed axially centrally in a rear end portion of said ferrule main body in axial alignment with and in communication with said core wire receiving bore, said core wire receiving bore having a smaller inner diameter than said sheath receiving bore;

a flange portion extending radially and integrally from an axially intermediate part of said ferrule main body; and an insert pipe fitted on and bonded to said front end portion of said ferrule main body as a result of insert molding said cylindrical main body around said insert pipe;

said insert pipe being provided with a coaxial small-diameter tubular portion in a front end thereof so as to form a thin-walled plastic portion of said cylindrical main body between an inner circumferential surface of said small-diameter tubular portion and said core wire receiving bore.

2. A plastic ferrule according to claim 1, wherein said small-diameter tubular portion is formed by drawing a front end portion of said insert pipe.

3. A plastic ferrule according to claim 1, wherein said small-diameter tubular portion is formed by machining an outer circumference of a front end portion of said insert pipe.

4. A plastic ferrule according to claim 1, wherein said small-diameter tubular portion is formed by folding a front end portion of said insert pipe coaxially inward.

5. A plastic ferrule according to claim 1, wherein said insert pipe includes an outer pipe portion and an inner pipe portion received in said outer pipe portion, and said small-diameter tubular portion is formed by a front end portion of said inner pipe portion projecting from a front end of said outer pipe portion.

6. A plastic ferrule according to claim 5, wherein said outer and inner pipe portions are closely fitted one in the other.

7. A plastic ferrule according to claim 5, wherein a base end of said inner pipe portion is closely fitted in said outer pipe portion and a front end of said inner pipe portion is spaced radially from said outer pipe portion.

8. A plastic ferrule according to claim 5, wherein said inner pipe portion extends substantially over an entire length of said ferrule main body, and defines an inner circumferential surface of said sheath receiving bore of the ferrule main body while said outer pipe portion defines an outer circumferential surface of said front end of said ferrule.

9. A plastic ferrule according to claim 1, wherein a front end of said small-diameter tubular portion terminates short of a front end surface of said ferrule main body, and said ferrule main body comprises a plastic reservoir formed around the front end of said small diameter tubular portion.

10. A plastic ferrule according to claim 1, wherein a base end of said insert pipe partly overlaps said flange portion.

\* \* \* \* \*